Nov. 19, 1957 A. J. PIEL 2,813,510
ANIMAL ACTUATED LIQUID APPLICATOR FOR HIDE
Filed Feb. 13, 1956
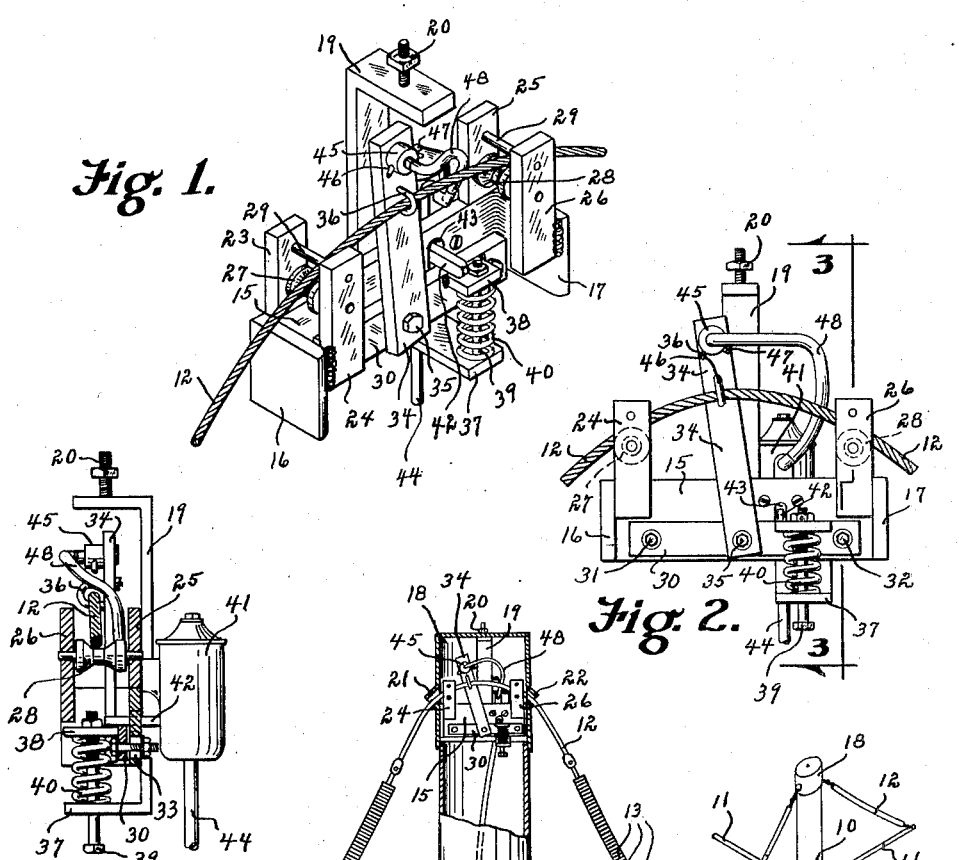
*INVENTOR.*
A. J. PIEL
*BY*
M. Talbert Dick
*ATTORNEY*
*Witness.*
A. S. Martin

# United States Patent Office 2,813,510
Patented Nov. 19, 1957

2,813,510

ANIMAL ACTUATED LIQUID APPLICATOR FOR HIDE

Alfred J. Piel, Hubbard, Iowa

Application February 13, 1956, Serial No. 565,188

12 Claims. (Cl. 119—157)

This invention relates to a device for applying liquid lotions, medicated chemicals, oils and like to the skin and/or hair of animals, such as cows, horses, pigs and like.

Especially in the raising of cattle, the outside of the animal is often treated to make the hair oily and brilliant. If an oil is used, the skin of the animal is also treated and greatly benefited. Often the solutions used prevent skin disease, and eliminates parasites such as ticks, flies, and like. Some effort has been made to provide rubbing cables saturated with the liquid treatment wherein the animal will rub or scratch itself on the cable and thereby distribute the liquid treatment over its body. Obviously, the chief problem with such equipment is the continuous saturating of the cable so that when the animal uses the rubbing cable, it will rub off on its hide sufficient liquid to obtain the desired results.

Therefore, one of the principal objects of my invention is to provide a means that will automatically successfully maintain a supply of suitable liquid on the rubbing cable.

More specifically the object of this invention is to provide a liquid pump that is actuated by the animal's pressure on the cable during the rubbing or scratching activity.

A further object of my invention is to provide an animal liquid applicator that once set up requires little if any attention from the stockman.

Still other objects of this invention are to provide an automatic animal oiler or like that is economical in manufacture, and durable in use.

These and other objects will be apparent to those skilled in the art.

My invention consists in the construction, arrangements, and combination of the various parts of the device, whereby the objects contemplated are attained as hereinafter more fully set forth, pointed out in my claims, and illustrated in the accompanying drawings, in which:

Fig. 1 is a perspective view of my pump means,

Fig. 2 is a side view of the pump means and more fully illustrates its construction, Fig. 3 is a cross sectional view of the cable operated pump means taken on line 3—3 of Fig. 2, Fig. 4 is a side view of my pump means installed in an oiler and ready for use, and Fig. 5 is a diagrammatic reduced perspective view of the device in use.

I have herebefore referred to saturated rubbing cables. Such cables usually have rotatable washers around them for holding the fluid and also they provide a roll contact with the animal. In the drawings I show a vertical post tank 10 held in upright position by the ground engaging horizontal legs 11. The numeral 12 designates a cable which I have secured at one end to the outer end of one of the legs 11, passed upwardly to the upper portion of the tank 10, and thence downwardly and outwardly to the outer end of the diametrically opposed leg 11, at and to which it is secured, as shown in Fig. 4. This cable may be of one piece, or made up of several lengths, as shown in Fig. 4. This cable provides two animal rubbing or scratching bar portions at the two sides respectively of the tank post. These portions each extend upwardly and inwardly to the upper portion of the tank. The numeral 13 designates washers threaded on each side of the cable length. These washers may be of any suitable type and some may be star-type washers. They hold the solution between them and roll with and on the skin and hair of the animal rubbing against them. As before indicated, the solution 14 in the tank may be medicated, an oil, or an insecticide. It is to such equipment that I apply my invention and which I will now describe in detail.

The numeral 15 designates a cross base bar having a vertical plate at each end designated by the numerals 16 and 17. These two ends 16 and 17 may be secured by any suitable means to either the inside wall of the tank 10, or to the inside of the tank cap lid 18. In the drawings I show my unit inside the cap lid and bearing onto the top rim of the tank 10, but this manner of supporting the unit is illustrative only. An arm bracket 19 extends upwardly from the part 15 to the inside top of the cap lid. A bolt means 20 detachably secures the cap lid to the arm bracket. The upper central portion of the cable 12 passes through the cap lid via two diametrically opposed openings 21 and 22. At each end of the member 15 and operatively secured thereto is a pair of spaced apart bearing posts numbered 23, 24, and 25, 26, respectively, as shown in Fig. 1. The numeral 27 designates a pulley wheel rotatably mounted between the post bearings 23 and 24, and the numeral 28 designates a pulley wheel rotatably mounted between the posts 25 and 26. The central top portion of the cable 12 passes over these two wheels 27 and 28, as shown in Fig. 2. A cable retaining pin, bolt or like 29 may extend above each of the pulley wheels if desired. The numeral 30 designates a bar having its left end hinged by a bolt means 31 to the left end portion of the member 15. The right end of this bar has limited vertical movement by a bolt means 32 extending through the right end portion of the bar and through a vertical slot 33 in the right end portion of the member 15, as shown in Fig. 3.

The numeral 34 designates an upwardly extending actuating arm pivoted by a bolt or like means 35 to the central area of the bar 30. The numeral 36 designates a U-bolt embracing the center of the cable and extending through the upper portion of the actuating bar 34. Prior to actual use and after adjustment this U-bolt is tightened to rigidly secure the cable 12 to the actuating arm 34. In Fig. 3 this U-bolt is shown in loosened condition for cable adjustment. The U-bolt is in a horizontal plane above that of the horizontal plane of the pulley wheels 27 and 28. The numeral 37 designates a bracket on the bottom of the part 15. The numeral 38 designates a ledge flange on the part 30 and above the bracket 37. The numeral 39 dseignates a bolt loosely slidably extending through the bracket 37 and ledge 38. The numeral 40 designates a coil spring, embracing the bolt 39 and positioned between the bracket 37 and ledge 38 for yieldingly holding the right end of the bar 30 in the extreme upper position of its movement. The numeral 41 designates an ordinary standard liquid bellows pump secured to the back side of the part 15 and having the usual actuating lever 42. This lever 42 extends through a slot 43 in the part 15 and above the bar 30, as shown in Fig. 1. The numeral 44 designates a conduit extending from the inlet part of the pump to the inside bottom area of the tank 10. The numeral 45 designates a liquid distributing head on the post bar 34 and above the cable 12, as shown in Fig. 2. This head has two nozzles 46 and 47 extending downwardly and away from each other and toward the cable 12. The numeral 48 designates a flexible conduit extending from the outlet port of the pump to the head 45.

In use, whenever an animal rubs against either side end of the cable 12 it will tighten and be pulled downwardly over the pulley wheel at that side. This will also pull the bar arm 34 downwardly, forcing the bar 30 to swing downwardly against the action of the spring 40. When this happens, the actuating arm 42 of the bellows pump will move to a normal lowered position. As soon as pressure on the cable is released by the animal, the spring 40 will raise the member 30, thereby raising the pump lever 42 and actuating the pump. The pump will draw liquid up from the tank 10, through the conduit 44, force the liquid through the conduit 48 into the head 45, thence it is squirted out of the nozzles 46 and 47 in two directions onto the cable. The liquid will then run down each side portion of the cable and onto the skin of the animals engaging the cable.

Some changes may be made in the construction and arrangement of my liquid applicator for treatment of the hair and skin of animals without departing from the real spirit and purpose of my invention, and it is my intention to cover by my claims, any modified forms of structure or use of mechanical equivalents which may be reasonably included within their scope.

I claim:

1. In a device of the class described, a tank, a bearing frame mounted in the upper portion of said tank, two spaced apart wheels rotatably mounted on said bearing frame, a cable extending over said two wheels and extending downwardly and outwardly in two directions, a means for anchoring the two ends of said cable, a liquid pump secured to said bearing frame having an actuating member, a conduit extending from the bottom area of said tank to said pump, a means for operatively securing the actuating member of said pump to said cable, and a discharge conduit leading from said pump to a point in the vicinity of said cable.

2. In a device of the class described, a tank, a bearing frame mounted in the upper portion of said tank, two spaced apart wheels rotatably mounted on said bearing frame, a cable extending over said two wheels and extending downwardly and outwardly in two directions, a means for anchoring the two ends of said cable, a liquid pump secured to said bearing frame having an actuating member, a conduit extending from the bottom area of said tank to said pump, a means for operatively securing the actuating member of said pump to said cable, and a discharge conduit leading from said pump to a point in the vicinity of said cable at a point between said wheels.

3. In a device of the class described, a tank, a bearing frame mounted in the upper portion of said tank, two spaced apart pulley wheels rotatably mounted on said bearing frame, a cable extending over said two wheels and extending downwardly and outwardly in two directions, a means for anchoring the two ends of said cable, a liquid pump secured to said bearing frame having an actuating member, a conduit extending from the bottom area of said tank to said pump, a means for operatively securing the actuating member of said pump to said cable, and a discharge conduit leading from said pump to a point in the vicinity of said cable.

4. In a device of the class described, a tank, a bearing frame mounted in the upper portion of said tank, two spaced apart wheels rotatably mounted on said bearing frame, a cable extending over said two wheels and extending downwardly and outwardly in two directions, a means for anchoring the two ends of said cable, washers embracing each side length of said cable, a liquid pump secured to said bearing frame having an actuating member, a conduit extending from the bottom area of said tank to said pump, a means for operatively securing the actuating member of said pump to said cable, and a discharge conduit leading from said pump to a point in the vicinity of said cable.

5. In a device of the class described, a tank, a bearing frame mounted in the upper portion of said tank, two spaced apart wheels rotatably mounted on said bearing frame, a cable extending over said two wheels and extending downwardly and outwardly in two directions, a means for anchoring the two ends of said cable, a liquid pump secured to said bearing frame having an actuating member, a spring means for yieldingly holding said actuating member in one direction of its movement, a conduit extending from the bottom area of said tank to said pump, a means for operatively securing the actuating member of said pump to said cable, and a discharge conduit leading from said pump to a point in the vicinity of said cable.

6. In a device of the class described, a tank, a bearing frame mounted in the upper portion of said tank, two spaced apart wheels rotatably mounted on said bearing frame, a cable extending over said two wheels and extending downwardly and outwardly in two directions, a means for anchoring the two ends of said cable, a liquid pump secured to said bearing frame having an actuating member, a conduit extending from the bottom area of said tank to said pump, a bar pivoted at one end to said bearing frame, a bar post extending upwardly from said bar, a means for securing said cable at a point between said two wheels to said bar post; said actuating member of said pump being associated with said bar, a nozzle means on said post bar and directed toward said cable, and a conduit leading from said pump to said nozzle means.

7. In a device of the class described, a tank, a bearing frame mounted in the upper portion of said tank, two spaced apart wheels rotatably mounted on said bearing frame, a cable extending over said two wheels and extending downwardly and outwardly in two directions, a means for anchoring the two ends of said cable, a liquid pump secured to said bearing frame having an actuating member, a conduit extending from the bottom area of said tank to said pump, a bar pivoted at one end to said bearing frame, a spring means for holding said bar in one direction of its swinging movement, a bar post extending upwardly from said bar, a means for securing said cable at a point between said two wheels to said bar post; said actuating member of said pump being associated with said bar, a nozzle means on said post bar and directed toward said cable, and a conduit leading from said pump to said nozzle means.

8. In a device of the class described, a tank, a bearing frame mounted in the upper portion of said tank, two spaced apart wheels rotatably mounted on said bearing frame, a cable extending over said two wheels and extending downwardly and outwardly in two directions, a means for anchoring the two ends of said cable, a liquid pump secured to said bearing frame having an actuating member, a conduit extending from the bottom area of said tank to said pump, a bar pivoted at one end to said bearing frame, a spring means for holding said bar in one direction of its swinging movement, a means for limiting the swinging movement of said bar in both directions, a bar post extending upwardly from said bar, a means for securing said cable at a point between said two wheels to said bar post; said actuating member of said pump being associated with said bar, a nozzle means on said post bar and directed toward said cable, and a conduit leading from said pump to said nozzle means.

9. In a device of the class described, a tank, a bearing frame mounted in the upper portion of said tank, two spaced apart wheels rotatably mounted on said bearing frame, a cable extending over said two wheels and extending downwardly and outwardly in two directions, a means for anchoring the two ends of said cable, a liquid pump secured to said bearing frame having an actuating member, a conduit extending from the bottom area of said tank to said pump, a bar pivoted at one end to said bearing frame, a bar post extending upwardly from said bar, a means for adjustably securing said cable at a point between said two wheels to said bar post; said actuating member of said pump being associated with said bar, a nozzle means on said post bar and directed toward said cable, and a conduit leading from said pump to said nozzle means.

10. In a device of the class described, a tank, a bearing frame mounted in the upper portion of said tank, two spaced apart wheels rotatably mounted on said bearing frame, a cable extending over said two wheels and extending downwardly and outwardly in two directions, a means for anchoring the two ends of said cable, a liquid pump secured to said bearing frame having an actuating member, a conduit extending from the bottom area of said tank to said pump, a bar pivoted at one end to said bearing frame, a bar post extending upwardly from said bar, a means for securing said cable at a point between said two wheels to said bar post; said actuating member of said pump being associated with said bar, a double nozzle means on said post bar and directed toward said cable, and a conduit leading from said pump to said nozzle means.

11. In a device of the class described, a tank, a bearing frame mounted in the upper portion of said tank, two spaced apart wheels rotatably mounted on said bearing frame, a cable extending over said two wheels and extending downwardly and outwardly in two directions, a means for anchoring the two ends of said cable, a liquid pump secured to said bearing frame having an actuating member, a conduit extending from the bottom area of said tank to said pump, a bar pivoted at one end to said bearing frame, a bar post extending upwardly from said bar and pivotally secured to said bar, a means for securing said cable at a point between said two wheels to said bar post; said actuating member of said pump being associated with said bar, a nozzle means on said post bar and directed toward said cable, and a conduit leading from said pump to said nozzle means.

12. In a device of the class described, a tank, a bearing frame mounted in the upper portion of said tank, a cable operatively movably mounted on said frame and extending downwardly and outwardly in two directions, a means for anchoring the two ends of said cable, a liquid pump secured to said bearing frame and having an actuating member, a means operatively connecting said pump with the interior of said tank, said actuating member on said pump operatively connected to said cable, and a discharge conduit leading from said pump to a point in the vicinity of said cable.

References Cited in the file of this patent
UNITED STATES PATENTS

| | | |
|---|---|---|
| 2,581,028 | Kirk | Jan. 1, 1952 |
| 2,706,465 | Caldwell | Apr. 19, 1955 |